Dec. 31, 1968   J. H. WHEELER   3,419,280
PRELOADED FLUID PACKING ASSEMBLY AND MALE ADAPTER
Filed March 22, 1965
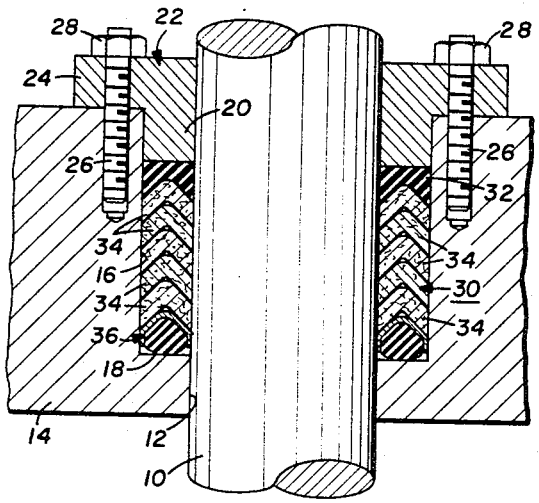
FIG. 1
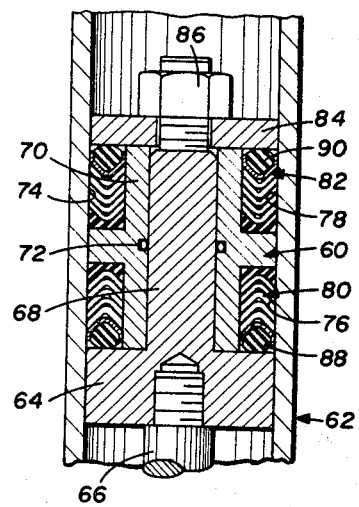
FIG. 6
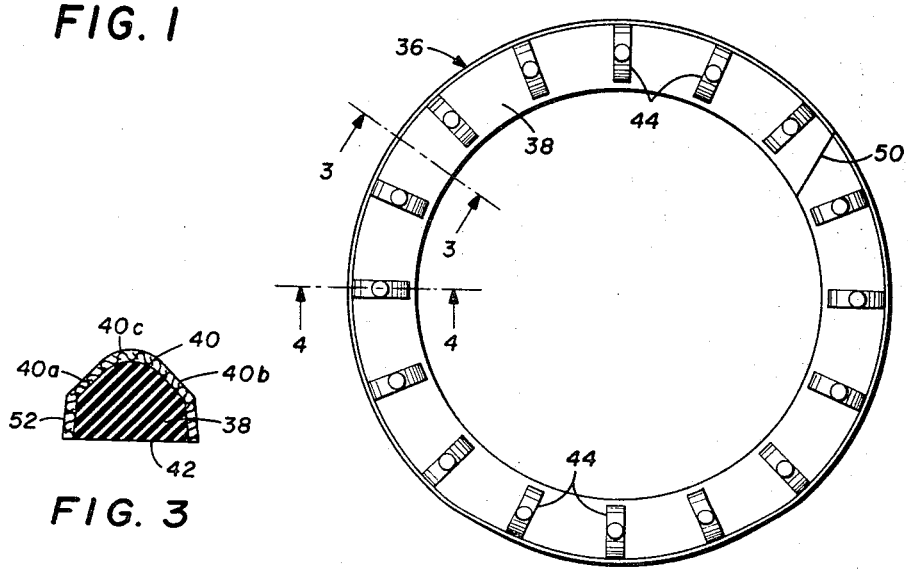
FIG. 2
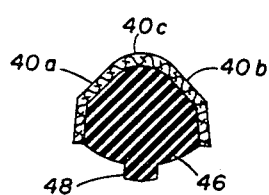
FIG. 3
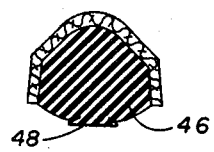
FIG. 4
FIG. 5
INVENTOR
JOHN H. WHEELER
BY
E. Mickey Hubbard
ATTORNEY United States Patent Office 3,419,280
Patented Dec. 31, 1968

3,419,280
PRELOADED FLUID PACKING ASSEMBLY
AND MALE ADAPTER
John H. Wheeler, P.O. Box 10823,
Dallas, Tex. 75207
Filed Mar. 22, 1965, Ser. No. 441,526
10 Claims. (Cl. 277—123)

ABSTRACT OF THE DISCLOSURE

A preloaded fluid packing assembly and male adapter for preloading the packing assembly which includes one or more sealing rings disposed in an annular gland having an end wall and a gland ring for longitudinally pressing the packing. The adapter ring includes an integral ring sized to fit in the gland, a sealing ring having one face conforming generally to the face of the adjacent sealing ring, and a plurality of circumferentially spaced, resilient, radially formed projections integral with the ring.

The present invention relates to rotating and reciprocating rod joints, and more particularly relates to a fluid packing assembly having an improved adapter ring for preloading the assembly.

As is well known, an annular fluid sealing means is required between a reciprocating rod or rotating shaft extending through the wall of a fluid vessel under pressure, either positive or negative, in order to prevent leakage of the fluid between the shaft and the wall. A typical annular sealing means is comprised of an annular chamber or gland formed between the rod and the wall having opposite annular ends. One or more resilient sealing rings are disposed in the gland around the rod to effect a fluid seal between the rod and the wall. The sealing rings may be of various configurations, but a plurality of double lipped sealing rings having a generally V-shaped cross section, with the open portion of the V facing the high pressure end of the gland, provides one of the best fluid seals of this type. When using a number V-rings, a female adapter ring having an annular groove for receiving the point of the V-type groove is usually positioned at the low pressure end of the gland, and a male adapter ring having a cross section conforming substantially to the open end of the V-type sealing ring is positioned at the high pressure end of the gland. The total length of the adapters and gland rings when relaxed is customarily longer than that of the gland itself, and a gland ring which forms one end of the gland is used to axially compress the several rings within the gland and thereby expand the opposite sealing lips into contact with both the rod and the wall to effect a seal.

In most V-ring packing assemblies, the axial position of the gland ring is adjustable so as to vary the degree of compression of the packing assembly over a relatively wide range. Then as the V-rings are worn by use, the gland ring can be further tightened to further load the assembly and expand the lips of the V-rings into contact with the rod and the wall. In addition to requiring periodic tightening of the gland ring, this type of assembly also has the disadvantage that the flat surface of the male adapter ring tends to act as a gasket between the packing assembly and the end of the packing gland so that high pressure fluid cannot equalize across the two lips of the first sealing ring. As a result, high pressure fluid surges tend to turn the male adapter ring and the first V-ring inside out and thereby destroy the packing assembly. Also, as the V-rings wear slightly so that the effect of the tightened packing gland is reduced, the V-rings adjacent the high pressure do not hold as much of the fluid pressure as the V-rings remote from the high pressure. This unequal distribution of pressure over the several rings results in a very much greater wear rate for the remote rings and a shortened useful life for the packing assembly as a whole. However, this type of assembly has the advantage that all rings are pliable and can be split and installed over the middle of the shaft, and as a result such rings are frequently used where the rings cannot easily be slipped over the end of the rods.

Fluid packing assemblies have also been used wherein the gland ring is not axially adjustable, but instead is tightened against the wall with a metal-to-metal contact. In such a packing assembly, the male adapter ring is normally biased against the V-rings to preload the sealing rings either by a coil spring disposed around a small diameter shaft, or by a number of small coil springs retained in bores located in small bores at circumferentially spaced points around the male adapter ring. This spring biasing preloads the V-rings which are expanded into sealing engagement with the rod and the wall. Spring-loaded packing assemblies thus automatically and continuously preload the V-rings to compensate for wear of the rings, thereby more evenly distributing the fluid pressure load over the several rings for a longer period of time to increase the useful life of the packing assembly. One such spring biased male adapter ring also provides bores through the ring for communicating fluid to the ring so that pressure surges will not turn the ring inside first V-ring so as to balance the pressure on the sealing out. However, this type of preloaded assembly has the very real disadvantage in that the male adapter rings are fabricated from a stiff material and cannot be installed over the middle of a rod, and the ring and springs are relatively expensive to manufacture.

The present invention is concerned with an improved packing assembly utilizing an improved adapter ring which is very economical to fabricate, yet which continually applies a preloading force to the sealing rings and provides balanced fluid pressure on the sealing rings, yet which can be installed over the middle of the rod.

In general, the present invention concerns an adapter ring for preloading a fluid packing assembly having one or more sealing rings disposed in an annular gland formed between a wall and a relatively moving rod, the gland having an annular end wall and a gland ring for longitudinally compressing the packing assembly. In accordance with this invention, the gland ring can be assembled in metal-to-metal contact with the flange portion of the assembly, or can be assembled at a predetermined position relative to the packing gland, so that the sealing rings and the unique male adapter ring are preloaded with a compressive force which presses the sealing lips into sealing engagement with the gland walls and rod. This preloading initiates a fluid seal which is then increased by fluid pressure. In addition to providing the correct initial preloading, the adapter ring continually exerts the correct amount of preloading force against the V-rings to compensate for the wear of the rings, without further adjustment of the position of the gland ring. The adapter ring is comprised of an integral ring sized to fit in the gland between an end wall and a sealing ring having one face conforming generally to the adjacent face of the adjacent sealing ring and having a plurality of circumferentially spaced, resilient projections formed integral with the ring for engaging the adjacent end wall of the gland and exerting a biasing force on the adapter ring when the assembly is axially compressed by the gland to force the adapter ring against the adjacent sealing ring and thereby preload the sealing ring.

In accordance with another important aspect of the invention, the adapter ring is fabricated from a pliable material and is radially split so that the ring may be installed over the middle of a rod.

In accordance with another aspect of the invention, the projections are so formed that when the ring is under maximum compression, the face of the ring is held in spaced relationship to the end of the gland to permit fluid to pass therebetween and equalize the pressure on the adjacent sealing ring.

The invention also concerns a packing assembly which is preloaded and has equalized pressures and which can be wholly installed over the middle of the packed rod as well as other more specific aspects which are hereafter pointed out with particularity in the appended claims.

Additional aspects, objects and advantages of the invention will be more apparent to those skilled in the art from the following detailed description and drawings, wherein:

FIGURE 1 is a sectional view through a typical rod joint using a fluid packing assembly constructed in accordance with the present invention;

FIGURE 2 is a view of the high pressure face of the male adapter ring used in the packing assembly of FIGURE 1 and constructed in accordance with the present invention;

FIGURE 3 is a sectional view taken substantially on lines 3—3 of FIGURE 2;

FIGURE 4 is a sectional view taken substantially on lines 4—4 of FIGURE 2;

FIGURE 5 is a sectional view similar to FIGURE 4 showing the adapter ring in loaded condition; and FIGURE 6 is a sectional view of another packing assembly constructed in accordance with the present invention used on a piston reciprocated within a cylinder.

Referring now to the drawings, and in particular to FIGURE 1, a rod or shaft 10 extends through a bore 12 in a wall 14. The shaft 10 may either reciprocate or rotate relative to the wall 14. An annular gland 16 is formed between the shaft 10 and the wall 14 by a counterbore to the bore 12 extending from the low pressure side of the wall 14. The bottom of the counterbore forms one end wall 18 at the high pressure end of the gland, and the boss 20 of the gland ring 22 forms the other end. It will be noted that the boss 20 extends into the gland 16 and that the flange portion 24 of the gland ring engages the face of the wall 14 in metal-to-metal contact. A plurality of circumferentially spaced studs 26 are threaded into the wall 14 and the flange 24 of the gland ring secured in place by nuts 28 threaded onto the studs 26. It will be noted that the gland ring can be forced axially towards the wall 14 by tightening the nuts 28 so as to axially compress the packing assembly which will now be described.

A packing assembly constructed in accordance with the present invention is indicated generally by the reference numeral 30. The packing assembly comprises a female adapter ring 32, a plurality of sealing rings 34, and a male adapter ring 36. The sealing rings 34 have dual sealing lips, one of which engages the shaft 10 and the other of which engages the sidewall of the gland 16. The sealing rings 34 may be conventional V-rings fabricated from a pliable material such as leather, composition, or synthetic rubber having a cross section substantially as illustrated. The female adapter ring 32 may be formed of a rigid material and has one flat face conforming to the flat face of the boss 20 and an opposite grooved face conforming generally to the adjacent face of the adjacent V-ring 34. The V-rings are preferably radially split so as to be installed over the center of the rod in the conventional manner. The male adapter ring 36 may be formed of a stiff material, such as metal or a stiff plastic composition, but in accordance with an important aspect of the invention is preferably fabricated from a pliable material, such as a synthetic rubber, and is split along a generally radially extending plane so that the adapter ring may be installed over the center of the shaft 10 in the same manner as the sealing rings 34.

The male adapter ring 36 is comprised of an integral body of material having a ring portion 38 with one face 40 which conforms essentially to the high pressure face of the adjacent sealing ring 34, and a face 42. The face 40 has a pair of tapered portions 40a and 40b which conform generally to the angle of the lips of the V-rings 34 and a rounded portion 40c at the apex so that when the adapter ring 36 is biased against the V-ring, the lips of the V-ring will be spread into contact with both the shaft 10 and the sidewall of the gland 16.

A plurality of integrally-formed projections 44 extend axially from the face 42 at circumferentially spaced points as can best be seen in FIGURE 2. Each of the projections 44 is formed from a resilient material and is preferably comprised of a strip portion 46, which extends generally radially across the face 42, and a cylindrical portion 48 which extends from the center of the strip portion 46. In accordance with an important, more specific aspect of the invention, the adapter ring 36 is fabricated from a pliable material and is radially split at 50 so that the ring may be installed over the center of the rod 10.

The diameter and length of the cylindrical portion 48 are selected, for the particular resilient material used, so that the projections collectively provide the biasing force needed to preload the V-rings 34 to the desired degree when the packing assembly is axially compressed, and to also provide the degree of elongation necessary to accommodate movement of the adapter member away from the end wall as the packing assembly is subjected to high fluid pressure surges. The total axial length of the packing assembly 30, when not compressed, is greater than the axial length of the gland 16 between the end wall 18 and the boss of the gland ring 22 by an amount sufficient to compress the cylindrical portions 48 substantially into the strip portions 46, as illustrated in FIGURE 5.

The resiliency of the cylindrical portion 48 when so compressed, together with that of the strip portion 46 immediately thereunder, produces a substantial biasing force which preloads the V-rings 34 to seat the opposite sealing lips against both the shaft 10 and the wall of the gland 16. This preloading results in the V-ring adjacent the high pressure forming an initial seal when subjected to a surge of pressure so that the pressure is more evenly distributed across the several V-rings 34. This produces a more uniform distribution of the pressure across the several V-rings and thereby substantially increases the useful life of the packing assembly, and in particular the life of the V-rings furtherest from the high pressure end of the gland which are normally subjected to the major portion of the pressure and which normally sustain a major portion of the wear.

The strip portions 46, which are not compressed, produce an irregularity in the high pressure face of the adapter ring 36 which permits the immediate transfer of high pressure fluid to the outside edge of the gland 16 so that the pressure on the male adapter ring and the first and all subsequent V-rings is substantially, and immediately equalized. This prevents the high pressure surges from reversing the V-rings and disrupting the sealing effect of the packing assembly.

The integral male adapted ring 36 may be fabricated using any conventional technique, such as molding. Although the ring portion or carcass of the adapter ring may be fabricated from a stiff material, such as metal or plastic, and the resilient projections adherently bonded thereto by a molding process, the entire adapter ring 36 is preferably molded from the same resilient material so that the adapted ring can be radially split and installed over the middle of the shaft 10. For example, a fabric ring, such as woven cotton, nylon, rayon or the like, may be impregnated with a synthetic rubber such as neoprene, placed in a mold conforming to the face 40, compressed and heated to form a basic carcass ring. Then a second ring of the resilient material is placed over the carcass ring and subjected to high compression in a die conforming to the face 42 and heated to form the integral ring having the projections 44.

It will be appreciated that the diameter and length of the cylindrical projections 48 should be selected based upon the axial distance traveled by the adapted ring 36 when the packing assembly is subjected to high pressure surges, the total biasing force required to preload the sealing rings to the desired degree, and the hardness of the resilient material used to form the projections. Of course, if the entire ring is fabricated from resilient material, the strip portions of the projections and portions of the ring body will also be compressed and lend some resilient force, although a small proportion of the total force. In one embodiment of the invention, an adapter ring for a 3-inch shaft having the configuration illustrated in FIGURE 2, including sixteen projections each having a cylindrical portion ⅛ of an inch in diameter and ⅟₁₆ of an inch in height above the strip portions, was fabricated entirely from Share A 70 durometer neoprene covered on the face 40 with cotton fabric. A total force of 90 lbs. was required to compress the cylindrical portions substantially flush with the strip portions, and this force provided a preloading on the V-rings 44 of approximately 17 lbs. per square inch.

It will be appreciated that the packing gland assembly and adapter ring for preloading the packing assembly may also be utilized to provide a peripheral seal between a piston reciprocating in a cylinder. For example, a piston 60 reciprocating in a cylinder 62 may be comprised of a body portion 64 which is threaded onto the piston rod 66 and conforms essentially to the I.D. of the cylinder 62, and an elongated stem portion 68 which is threaded at the upper end. A sleeve 70 is disposed around the stem 68 and the annulus sealed by an O-ring 72. The sleeve 70 has a radially extending flange 74 which forms a pair of oppositely facing glands 76 and 78. Packing assemblies 80 and 82, substantially identical to the packing assembly 30, are disposed in the glands 76 and 78 respectively. A gland ring 84 is then tightened against the upper end of the sleeve 70 by a nut 86 to axially compress the packing assemblies 80 and 82 as heretofore described. The packing assemblies include male adapter rings 88 and 90 like the packing ring 36 heretofore described which preload the V-type sealing rings in the respective glands and also equalize the pressure on the two lips of the sealing rings, as heretofore described.

From the above detailed description of preferred embodiments of the invention, it will be appreciated by those skilled in the art that an improved and more economical packing assembly has been described. The packing assembly may in its entirety be installed over the middle of the rod. Even though the gland ring is in metal-to-metal contact with the wall in which the gland is formed, the packing assembly is preloaded to more evenly distribute the fluid load among the several sealing rings as the assembly wears so as to have a longer useful life, and the pressure on each sealing ring is balanced between the two sealing lips so that high fluid pressure surges will not tend to reverse either the adapter ring or the sealing rings.

Although preferred embodiments of the invention have been described in detail, it is to be understood that various changes, substitutions and alterations can be made therein without departing from the spirit and scope of the invention as defined by the appended claims, which are intended to constitute the sole limitation upon the scope of the invention.

What is claimed is:

1. For use in a fluid packing assembly having at least one double lip sealing ring disposed in an annular gland formed between a wall and a relatively moving rod, the gland having an annular end wall at the high pressure end of the gland toward which the lips of the sealing rings extend and a gland ring compressing the packing in the gland, the improvement which comprises:
   an integral adapter ring sized to fit in the gland between said end wall and the adjacent sealing ring, the adapter ring having one face conforming generally to the adjacent high pressure face of the adjacent sealing ring and having a plurality of circumferentially spaced, integral, resilient projection means extending from the axially opposite other face for engaging the end wall and exerting a biasing force on the adapter ring and the adjacent sealing rings to preload the sealing ring when the packing assembly is compressed by the gland ring.

2. The male adapter ring defined in claim 1 wherein the integral ring is radially split whereby the adapter ring may be installed over the middle of the rod.

3. The male adapter ring defined in claim 1 wherein the other face is irregular when axially compressed to permit the passage of fluid between the ring and said adjacent end wall of the annular gland and equalize the pressure on the sealing rings.

4. The male adapter ring defined in claim 1 wherein:
   said other face of the integral adapter ring is generally planar and each of the projections is comprised of a raised strip portion extending generally radially across said other face of the ring, and a generally cylindrical portion extending from the strip portion, and wherein the two portions are so related in size that when the ring has been axially compressed to the desired degree, the strip portions are not fully compressed and hold the planar face spaced from the end wall to permit fluid to pass freely between the planar face and the end wall to equalize the pressure on the sealing lips of the adjacent sealing ring.

5. The male adapter ring defined in claim 1 wherein the integral ring is comprised of a substantially inflexible material and the projections are comprised of a material having a Shore A hardness of from about 50 to about 70 durometer.

6. The male adapter ring defined in claim 1 wherein the integral ring is comprised entirely of a resilient material of about the same hardness and the ring is radially split whereby the ring may be installed over the middle of a rod.

7. The male adapter ring defined in claim 1 wherein the integral ring has a woven fabric disposed in and covering said one face.

8. The fluid packing assembly which comprises, in combination:
   an annular gland formed between a rod which moves relative to a wall, the gland having opposite annular end walls one of which is formed by a gland ring axially compressing a packing assembly disposed in the gland,
   at least one pliable sealing ring disposed in the gland having a pair of opposite annular sealing lips engaging the inner and outer walls of the gland, the sealing lips extending toward the high pressure end of the gland,
   a female adapter ring disposed in the gland between the sealing ring and the low pressure end of the gland, and
   an integral male adapter ring disposed in the gland between the sealing ring and the high pressure end of the gland, the face of the male adapter ring adjacent the end of the gland having a plurality of circumferentially spaced, axially compressed, resilient projections contacting the end of the gland and biasing the adapter ring against the adjacent sealing ring, the opposite face of the adapter ring conforming substantially to the adjacent face of the sealing ring so that the force of the adapter ring will preload the sealing ring.

9. The combination defined in claim 8 wherein the female adapter ring, the sealing ring, and the male adapter ring are all fabricated from a pliable material and are radially split so that each ring may be installed around the middle of the shaft.

10. The combination defined in claim 8 wherein:
the projections from the male adapter ring comprise a strip portion extending generally radially across the face of the ring and a generally cylindrical portion extending from the strip portion having a cross-sectional area substantially less than the cross-sectional area of the strip portion, whereby the strip portion maintains the face of the male adapter ring spaced from the end of the gland under loaded conditions so as to permit fluid to flow freely between the adapter ring and the end of the gland and thereby equalize pressure on the sealing ring.

References Cited
UNITED STATES PATENTS

| | | | |
|---|---|---|---|
| 2,417,828 | 3/1947 | Joy | 277—75 |
| 2,442,687 | 6/1948 | Heathcott | 277—124 |
| 2,443,993 | 6/1948 | Schenkelberger | 277—205 X |
| 2,706,655 | 4/1955 | Showalter | 277—124 |
| 3,013,830 | 12/1961 | Milligan | 277—205 |
| 3,027,168 | 3/1962 | Herbruggen | 277—205 X |
| 3,120,394 | 2/1964 | Gould | 277—124 |

LAVERNE D. GEIGER, *Primary Examiner.*

J. S. MEDNICK, *Assistant Examiner.*

U.S. Cl. X.R.

277—124, 125, 205